US008630723B2

(12) United States Patent
Prieler et al.

(10) Patent No.: US 8,630,723 B2
(45) Date of Patent: Jan. 14, 2014

(54) METHOD FOR CONTROLLING BEHAVIORAL INTERVENTION OF A SUBMODULE

(75) Inventors: Siegfried Prieler, Tapfheim (DE); Holger Röhle, Burkhardtsdorf (DE)

(73) Assignee: Siemens Aktiengesellschaft, Munich (DE)

( * ) Notice: Subject to any disclaimer, the term of this patent is extended or adjusted under 35 U.S.C. 154(b) by 79 days.

(21) Appl. No.: 13/461,147

(22) Filed: May 1, 2012

(65) Prior Publication Data

US 2012/0283847 A1      Nov. 8, 2012

(30) Foreign Application Priority Data

May 2, 2011 (EP) .................................... 11164402

(51) Int. Cl.
*G05B 11/01* (2006.01)

(52) U.S. Cl.
USPC .......... 700/19; 700/3; 700/9; 700/11; 700/20; 700/22; 700/29

(58) Field of Classification Search
None
See application file for complete search history.

(56) References Cited

U.S. PATENT DOCUMENTS

| | | | |
|---|---|---|---|
| 2002/0077711 A1* | 6/2002 | Nixon et al. | 700/51 |
| 2005/0197806 A1* | 9/2005 | Eryurek et al. | 702/188 |
| 2010/0094433 A1 | 4/2010 | Lessmann | |

FOREIGN PATENT DOCUMENTS

| | | |
|---|---|---|
| DE | 10 2007 025892 | 12/2008 |
| DE | 10 2009 047804 | 3/2011 |
| EP | 2 187 281 | 5/2010 |

OTHER PUBLICATIONS

PI: "Increasing the Energy Efficiency of Automation using Smart Energy Management over PROFINET", The Profienergy Profile, Mar. 2010, XP000002658889, Karisruhe, Germany, Chapter 1, 4, 6, 8; Others; 2010; DE.
Peter Klueger, Peter Wenzel: "Was bringt das PROFI-Energy-Profil der PNO?", Apr. 14, 2009, XP000002658890, Gefunden im Internet: URL:http://www.computer-automation.de/feldebene/vernetzung/news/article/71654/1/Was_bringt_das_PROFIEnergy-Profil_der_PNO/[gefunden am Sep. 7, 2011], das ganze Dokument: Others; 2009; DE.
Siemens: "Saving Energy with SIMATIC S7, PROFIenergy with ET200S", Aug. 2010, XP000002658891, Gefunden im Internet: URL:http://cache.automation.siemens.com/dnl/zA/zAxNTk5MwAA_41986454_Tools/41986454_PROFIenergy_ET200S_DOKO_V10_en.pdf [gefunden am Sep. 7, 2011], Chapter 3.1, 4; Others; 2010.

* cited by examiner

*Primary Examiner* — Sean Shechtman
(74) *Attorney, Agent, or Firm* — Cozen O'Connor

(57) ABSTRACT

A method for controlling behavioral intervention of a submodule, where a device model is used to model and operate an automation system, where the device model comprises an input/output device, a first module including at least one submodule and a first controller, a supervisory controller and a control module including at least one control submodule. The submodule is provided with a behavior identification code and behavior information in addition to interconnection information. A respective control submodule having a specific behavior identification code is addressed by the supervisory controller to control the intervention in the submodule, where the addressed control submodule thereupon issues a control command containing the specific behavior identification code to all other submodules, and where the other submodules having the specific behavior identification code are induced to adopt a behavioral change based on the behavior information.

10 Claims, 3 Drawing Sheets

METHOD FOR CONTROLLING BEHAVIORAL INTERVENTION OF A SUBMODULE

BACKGROUND OF THE INVENTION

1. Field of the Invention

The invention relates to a method for controlling intervention in the behavior of a submodule, where use is made of a device model for modeling and subsequent operation of an automation system, where device model comprises an input/output device, at least one first module, which in turn has at least one submodule, and a first controller, and where the device model and the first controller are provided with interconnection information that defines an assignment between the first controller and the at least one submodule.

2. Description of the Related Art

Modeling of a device model is particularly applied, for example, in the Profinet standard (International Electrotechnical Commission (IEC) 61585/61784). In this standard, the controller and I/O device, where the I/O device corresponds to the input/output device, are specified as the device types.

According thereto, the device model for I/O devices consists of objects, i.e., I/O device modules and submodules. According to the Profinet specification, a submodule possesses the following interfaces: an I/O interface for cyclic data exchange, a data record interface for acyclic data exchange, and an alarm interface for event-driven data exchange. The Profinet specification provides that a submodule having interfaces is uniquely assigned to one controller. It is also permitted to distribute the submodules of an I/O device over a plurality of controllers. The assignment of submodules of one I/O device to a plurality of controllers is referred to as a "shared device" policy.

In shared devices, submodules are uniquely assigned to one controller and only one application of the controller can control the assigned submodules. An I/O management strategy, i.e., a rule governing how the inputs/outputs of an I/O device are to be controlled, is realized by the controllers.

If it is now desired to make use of an energy management solution, for example, Profi Energy (PE), referred to in the following as PE management, a further controller is deployed to handle the energy management for the I/O device. The intention is then for the PE management to be able to place the entire I/O device or parts thereof into an energy-saving mode and reset the entire I/O device again. The requirement that a controller should handle the energy management (PE management) for the entire I/O device, in parallel with the I/O management, has hitherto not been possible in conventional systems. The reason is that this requires a change in the assignment of the submodule to the controller. This necessitates a new configuration and parameterization of the submodules.

SUMMARY OF THE INVENTION

It is therefore an object of the invention to provide a method that enables an I/O management strategy to be used in parallel with a PE management strategy for a shared device without the requirement for a new configuration and parameterization of the submodules.

This and other objects and advantages are achieved in accordance with the invention by providing a method for controlling intervention in the behavior of a submodule in which a supervisory controller and a control module are additionally used, and where the control module includes at least one control submodule. A behavior identification code and behavior information are provided to the submodules in addition to the interconnection information. The behavior identification code in the submodules corresponds to a behavior identification code in the control submodule and a respective control submodule including a specific behavior identification code is addressed by the supervisory controller for the controlling intervention in the submodules. The addressed control submodule thereupon issues a control command containing the specific behavior identification code to all the other submodules. The submodules having the specific behavior identification code are induced to adopt a change in behavior based on the behavior information.

A universal interface between the modules and submodules to a further controller is thus provided with the aid of the additionally introduced supervisory controller and the additional control module. As a result, it is possible to intervene in a controlling manner in the behavior of the submodules from a further controller if the submodules are implemented in accordance with the Profinet standard for shared devices.

Advantageously, the method is applied such that the modified behavior acts on an input/output interface in the submodules, and the submodules are induced to assume or quit an energy-saving mode. Although Profinet prescribes or specifies a unique assignment of controller to submodules and submodules may exchange their data (cyclic I/O data, acyclic data records, event-driven alarms) with the uniquely assigned controller only, it is now possible to transmit control instructions, commands or Profi Energy commands (Start_Pause, End_Pause) to the other submodules by way of the supervisory controller, which is configured as an energy management controller. Based on the likewise transmitted behavior identification code, the submodules can decide with the aid of the behavior identification code and the additional commands to modify their behavior, for example, to transition to an energy-saving mode.

It is of advantage for the automation system if a fieldbus of the automation system is mapped onto the input/output device by modeling. A fieldbus can be a Profibus or a Profinet, for example.

If the device model is operated in compliance with the Profinet specification, the method affords the advantage that when a PE management strategy is used in addition to the I/O management, there is no requirement to reconfigure the submodules, and a manual intervention is unnecessary. The requirement of a new configuration that would otherwise be usual and loaded into the controller via an engineering system before the controller can establish the new assignments is obviated.

When used in automation systems for controlling and automating industrial processes, it is particularly advantageous if the first controller is operated as an input/output controller in the form of a programmable logic controller.

If the input/output device is implemented with a backplane bus, it is advantageous if the backplane bus is operated in the input/output device such that an instruction for initiating a corresponding change in behavior is sent to all the submodules by a broadcast command from the supervisory controller.

In an embodiment including a broadcast command, it is particularly advantageous if access points are set up in the control submodules, and the supervisory controller addresses the control submodules using the access points. Preferably, a backplane-bus-specific broadcast service is then activated with the assistance of one of the access points and the behavior identification code so that the one access point and the behavior identification code are transmitted to all the submodules.

Preferably, a second controller accesses the input/output device jointly with the first controller. In accordance with the method of the invention, a "shared device" is realized in this way. This approach saves costs, since I/O points for different controllers can be combined in one I/O device.

Other objects and features of the present invention will become apparent from the following detailed description considered in conjunction with the accompanying drawings. It is to be understood, however, that the drawings are designed solely for purposes of illustration and not as a definition of the limits of the invention, for which reference should be made to the appended claims. It should be further understood that the drawings are not necessarily drawn to scale and that, unless otherwise indicated, they are merely intended to conceptually illustrate the structures and procedures described herein.

BRIEF DESCRIPTION OF THE DRAWINGS

An exemplary embodiment is explained in more detail with reference to the drawing, in which.

DETAILED DESCRIPTION OF THE PREFERRED EMBODIMENTS

Figure 1:
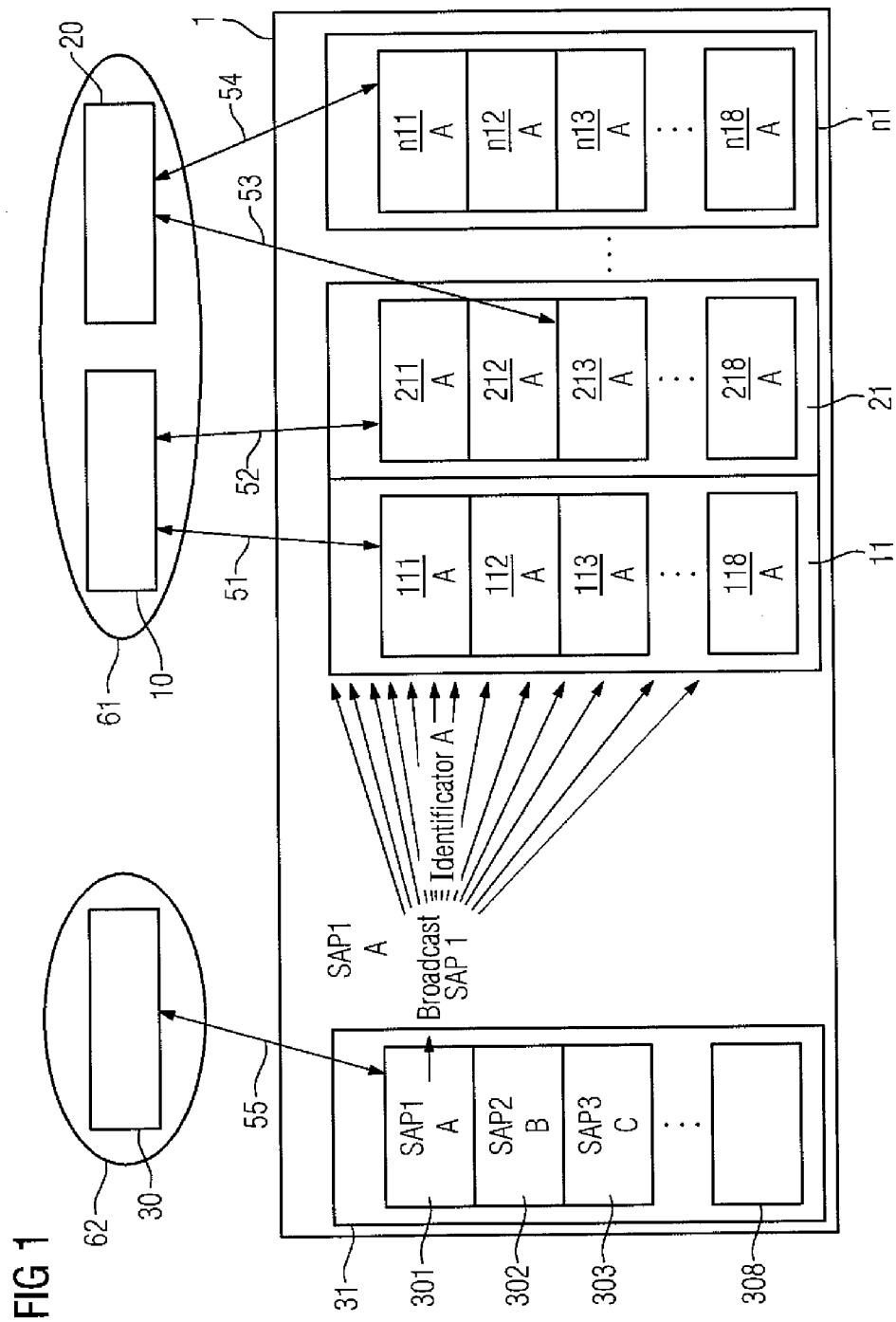
FIG. 1 is a schematic block diagram illustrating the principle of operation of the behavior identification code and of a broadcast service.

FIG. 1 shows an input/output device 1 comprising a first module 11, a second module 21, and up to an nth module n1. The modules 11 to n1 each have submodules 111 to n18. Taking the first module 11 as an example, the first module 11 comprises a first submodule 111, a second submodule 112, a third submodule 113, and up to an eighth submodule 118.

The input/output device 1 is connected to higher-ranking controllers by communication links, where a first controller 10 and a second controller 20 are responsible for I/O management 61 and a supervisory controller 30 handles PE management 62, i.e., energy management. The first controller 10 is connected to the first module 11 by a first communication link 51, and to the second module 21 by a second communication link 52. The input/output device 1 is implemented as a shared device. Consequently, there is a third communication link 53 from the second controller 20 to some of the submodules of the second module 21, i.e., the submodules 213 to 218. A fourth communication link 54 exists between the second controller 20 and all the submodules n11 to n18 of the nth module 2n.

A fifth communication link 55 exists between the supervisory controller 30 and the control module 31 for performing the PE management 62. This additional supervisory controller 30 and the additional control module 31 are now used for energy management of the input/output device 1, though they can also be used in a generally applicable manner as a universal interface to the modules of the input/output device 1. The control module 31 includes a first control submodule 301, a second control submodule 302, a third control submodule 303, up to an eighth control submodule 308. In order to use the method for controlling intervention in the behavior of the submodules, the control submodule 301 is parameterized with a behavior identification code A, the second control submodule 302 is parameterized with a behavior identification code B, and the third control submodule 301 is parameterized with a behavior identification code C. In the contemplated exemplary embodiment, all of the submodules 111 to n18 likewise have the behavior identification code A as identifier A. The behavior identification code A in the submodules 111 to n18 corresponds to the behavior identification code A in the first control submodule 301.

For a controlling intervention in the behavior of the submodules 111 to n18 having the behavior identification code A, the first control submodule 301 is addressed by the supervisory controller 30, where a control command having the specific behavior identification code A is thereupon issued by the addressed first control submodule 301 to all the other submodules 111 to n18, where the submodules having the behavior identification code A are induced to adopt a change in behavior based on the behavior information that is also transmitted in the command.

A modified behavior can be, for example, a Profi Energy command, such as "Start_Pause" or "End_Pause". The control submodules preferably have access points, which can also be referred to as Service Access Points. Accordingly, the first control submodule 301 has a first access point SAP1, the second control submodule 302 has a second access point SAP2, and the third control submodule 303 has a third access point SAP3. The input/output device 1 has a backplane bus over which a broadcast command is sent as a control instruction. By way of the fifth communication link 55, the supervisory controller 30 instructs the first control submodule 301 having the first access point SAP1 to initiate a broadcast transmission containing the behavior identification code A. All the submodules 111 to n18 that have the behavior identification code A, i.e., the identifier A, are now controlled by the PE management 62 and can switch from a previously prevailing input/output state into an energy-saving mode.

The supervisory controller 30 responsible for energy management can therefore influence the behavior of I/O submodules for an energy-saving mode using a plurality of access points SAP1, SAP2 and SAP3 for a Profi Energy application or for PE management 62. The access points can be set up and the submodules parameterized with their behavior identification codes using standardized Profinet protocol services. The backplane-specific broadcast service and the access point with its behavior identification code represent a successful separation between PE management 62 and I/O management 61 and can advantageously be particularly used with shared devices.

The method in accordance with the disclosed embodiments of the invention makes it possible for the I/O management 61 and the PE management 62 to operate side-by-side. In conventional methods, an energy management controller could not be used because in shared devices the submodules are uniquely assigned to one controller, and only the application of the controller can control the submodules.

Figure 2:
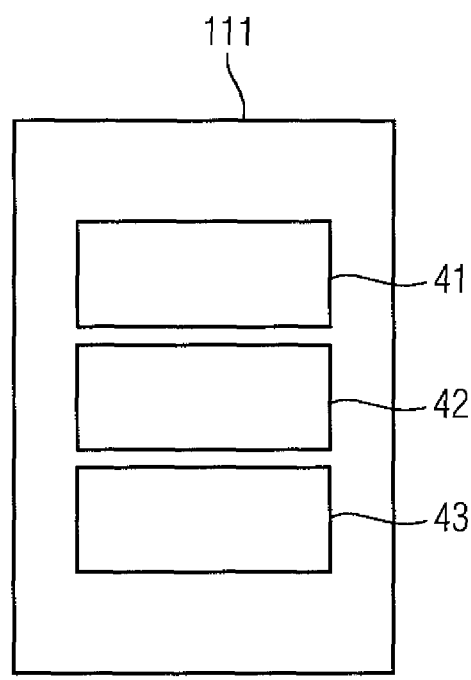
FIG. 2 is a schematic block diagram of a submodule including interfaces.

According to FIG. 2, the first submodule 111 is taken as an example to illustrate a breakdown of the interfaces of the submodule 111. Cyclic I/O data can be exchanged over an input/output interface 41. Event-driven alarms can be sent over an alarm interface 42, and acyclic data records can be output via a data record interface 43.

Figure 3:
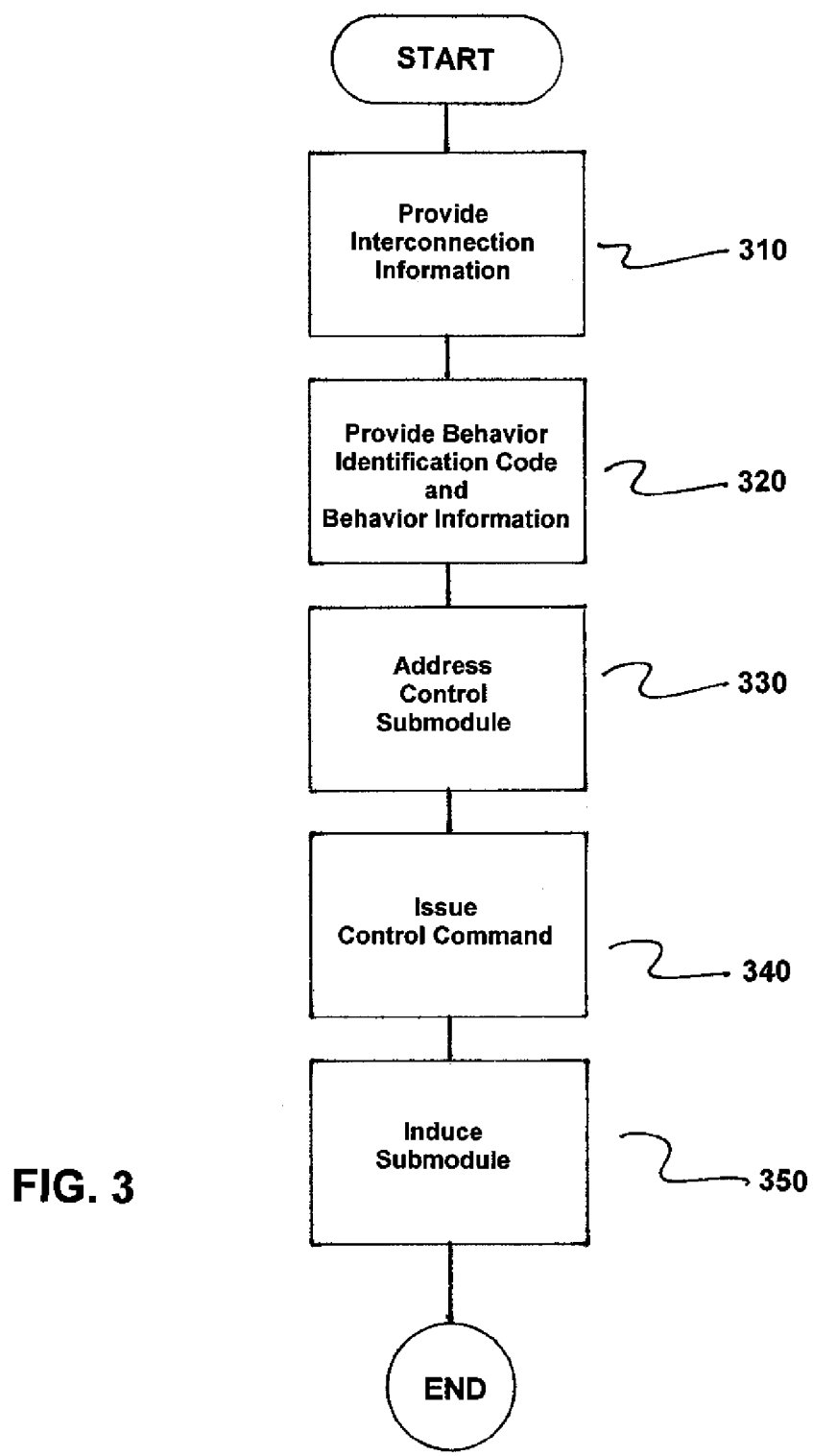
FIG. 3 is a flow chart of the method in accordance with an embodiment of the invention.

FIG. 3 is a flow chart of a method for controlling behavioral intervention of a submodule using a device model for modeling and subsequent operation of an automation system, a first controller, a supervisory controller, and a control module, where the device model comprises an input/output device and at least one first module including at least one submodule, and where the control module includes at least one control submodule. The method comprises providing the device model and the first controller with interconnection information defining an assignment between the first controller and the at least one submodule, as indicated in step 310.

A behavior identification code and behavior information is provided to the at least one submodule in addition to the interconnection information, as indicated in step 320. Here, the behavior identification code in the at least one submodule corresponds to a behavior identification code in the at least one control submodule.

A respective at least one control submodule having a specific behavior identification code is addressed by the supervisory controller for a controlling intervention in the at least one submodule, as indicated in step 330. A control command containing an associated specific behavior identification code is issued by the addressed respective at least one control submodule to the at least one submodule, as indicated in step 340.

The at least one submodule having the associated specific behavior identification code is then induced to adopt a change in behavior based on the behavior information, as indicated in step 350.

Thus, while there have shown and described and pointed out fundamental novel features of the invention as applied to a preferred embodiment thereof, it will be understood that various omissions and substitutions and changes in the form and details of the devices illustrated, and in their operation, may be made by those skilled in the art without departing from the spirit of the invention. For example, it is expressly intended that all combinations of those method steps which perform substantially the same function in substantially the same way to achieve the same results are within the scope of the invention. Moreover, it should be recognized that method steps shown and/or described in connection with any disclosed form or embodiment of the invention may be incorporated in any other disclosed or described or suggested form or embodiment as a general matter of design choice. It is the intention, therefore, to be limited only as indicated by the scope of the claims appended hereto.

What is claimed is:

1. A method for controlling behavioral intervention of a submodule using a device model for modeling and subsequent operation of an automation system, a first controller, a supervisory controller, and a control module, said device model comprising an input/output device and at least one first module including at least one submodule, and said control module including at least one control submodule, the method comprising:

providing the device model and the first controller with interconnection information defining an assignment between the first controller and the at least one submodule;

providing the at least one submodule a behavior identification code and behavior information in addition to the interconnection information, the behavior identification code in the at least one submodule corresponding to a behavior identification code in the at least one control submodule;

addressing, by the supervisory controller, a respective at least one control submodule having a specific behavior identification code for a controlling intervention in the at least one submodule;

issuing, by the addressed respective at least one control submodule, a control command containing an associated specific behavior identification code to the at least one submodule; and inducing the at least one submodule having the associated specific behavior identification code to adopt a change in behavior based on the behavior information.

2. The method as claimed in claim 1, wherein the modified behavior acts on an input/output interface in the at least one submodule, and the at least one submodule is induced to one of assume and exit an energy-saving mode.

3. The method as claimed in claim 1, further comprising:
mapping a fieldbus of the automation system onto the input/output device by modeling.

4. The method as claimed in claim 2, further comprising:
mapping a fieldbus of the automation system onto the input/output device by modeling.

5. The method as claimed in claim 1, wherein the device model is operated in accordance with a Profinet specification.

6. The method as claimed in claim 1, wherein the supervisory controller comprises an energy management controller.

7. The method as claimed in claim 1, wherein the first controller is an input/output controller comprising a programmable logic controller.

8. The method as claimed in claim 1, wherein the input/output device includes a backplane bus, a broadcast command being sent over the backplane bus by the supervisory controller to said at least one submodule as an instruction for initiating a corresponding change in behavior.

9. The method as claimed in claim 1, further comprising:
setting up access points in each respective at least one submodule, the supervisory controller addressing the least one control submodule by the access points.

10. The method as claimed in claim 1, wherein a second controller accesses the input/output device jointly with the first controller.

* * * * *